US006489435B2

(12) United States Patent
Tanaka et al.

(10) Patent No.: US 6,489,435 B2
(45) Date of Patent: Dec. 3, 2002

(54) PROCESS FOR PRODUCING POLYAMIDE

(75) Inventors: Kazumi Tanaka, Niigata (JP); Hideyuki Kurose, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/764,285

(22) Filed: Jan. 19, 2001

(65) Prior Publication Data

US 2001/0012883 A1 Aug. 9, 2001

(30) Foreign Application Priority Data

Jan. 21, 2000 (JP) .......................... 2000-12879
Jan. 21, 2000 (JP) .......................... 2000-12880

(51) Int. Cl.$^7$ ..................... C08G 69/02; C08G 69/28
(52) U.S. Cl. .................. 528/310; 528/312; 528/322; 528/332; 528/335; 528/336; 528/339; 528/340
(58) Field of Search ................. 528/310, 312, 528/322, 335, 336, 339, 340

(56) References Cited

U.S. PATENT DOCUMENTS

| 3,679,635 A | * | 7/1972 | Portus ..................... 528/340 |
| 3,900,450 A | | 8/1975 | Jaswal et al. ............ 526/65 |
| 3,948,862 A | * | 4/1976 | Iwasyk ..................... 528/335 |
| 4,018,746 A | * | 4/1977 | Brinkmann et al. ....... 528/340 |
| 4,019,866 A | * | 4/1977 | Gaswal et al. ............ 525/432 |
| 4,131,712 A | * | 12/1978 | Sprauer .................... 528/335 |
| 4,433,136 A | * | 2/1984 | Miyamot et al. .......... 528/344 |
| 4,438,257 A | | 3/1984 | Miyamoto et al. ........ 528/347 |
| 4,465,821 A | * | 8/1984 | Nielinger et al. ......... 528/335 |
| 4,540,772 A | | 9/1985 | Pipper et al. ............. 528/335 |
| 5,416,189 A | * | 5/1995 | Vandevijer et al. ....... 528/332 |
| 5,674,974 A | | 10/1997 | Brearley et al. .......... 528/340 |
| 6,303,741 B1 | * | 10/2001 | Tanaka ..................... 528/332 |

FOREIGN PATENT DOCUMENTS

| EP | 071000 A | * | 2/1983 |
| EP | 084661 A | * | 8/1983 |
| JP | 5-52333 | | 2/1944 |
| JP | 44-22510 | | 9/1969 |
| JP | 49-20640 | | 5/1974 |
| JP | 56-46487 | | 11/1981 |
| JP | 44-3838 | | 7/1983 |

* cited by examiner

Primary Examiner—P. Hampton-Hightower
(74) Attorney, Agent, or Firm—Antonelli, Terry, Stout & Kraus, LLP

(57) ABSTRACT

The improved polyamide production method of the present invention is characterized by including a step of accurately regulating the molar balance between a diamine component and a dicarboxylic acid component to a desired balance in a batch-wise regulation tank, thereby preparing a slurry liquid substantially free from the amidation reaction. The slurry liquid thus prepared is fed to a batch-wise or continuous polymerization reactor, where the amidation reaction is proceeded to easily produce polyamide having a desired balance of the diamine component and the dicarboxylic acid component without causing a problem such as foaming, solidification, etc.

19 Claims, No Drawings

PROCESS FOR PRODUCING POLYAMIDE

BACKGROUND OF THE INVENTION

1. Field of the Invention

The present invention relates to a process for producing polyamide. More specifically, the present invention relates to a process for producing polyamide, comprising a step of preparing a substantially amidation-free slurry liquid comprising a xylylenediamine-rich diamine component and a dicarboxylic acid component in a batch-wise regulation tank. The slurry liquid is fed to a batch-wise or continuous polymerization reactor as a starting material to produce polyamide.

2. Description of the Prior Art

In the production of polyamide from a diamine component and a dicarboxylic acid component, an accurate molar balance between the diamine component and the dicarboxylic acid component is quite important for achieving an intended polymerization degree. To produce polyamide having an intended molar balance, special care is usually taken in accurately controlling the charge amounts of the diamine component and the dicarboxylic acid component as well as in preventing the diamine component from escaping from the reaction mixture. Although a batch-wise polymerization is clearly advantageous over a continuous polymerization with respect to the easy control of the molar balance, the production of polyamide by a continuous polymerization is also under consideration due to its low heat history and industrial advantages.

The charge amounts of the constitutional components of polyamide can be accurately controlled by adjusting pH when a nylon salt or its aqueous solution is used as the starting material to be fed to a polymerization reactor. However, there arises a problem attributable to the use of the nylon salt or its aqueous solution as the starting material.

In batch-wise polymerization using an aqueous solution of nylon salt, the polycondensation is conducted in the same reactor by heating a 50% aqueous solution of nylon salt under pressure, allowing the polycondensation to proceed in homogeneous phase while preventing the diamine component from escaping, and gradually releasing water vapor from the reactor after fixation of the diamine component to finally reach ordinary pressure or reduced pressure, thereby completing the polycondensation.

Known continuous polymerization is usually carried out by two or three stages according to the intended polymerization degree. In the first stage, an aqueous solution of nylon salt is fed to a reactor and subjected to polymerization therein to produce prepolymer. In the second stage, the prepolymer is separated from water and is further polymerized to reach the intended polymerization degree. Since the continuous polymerization is industrially advantageous as compared with the batch-wise polymerization, various techniques for the continuous polymerization using an aqueous solution of nylon salt as the starting material is disclosed in Japanese Patent Publication Nos. 44-22510, 49-20640, 56-46487, 5-52333, etc. However, the proposed methods requires a highly pressure-resistant vessel to prevent water used as the solvent from escaping in the initial stage of polymerization. In the final stage of polymerization, a large amount of water used as the solvent and the condensation water should be removed, and such removal requires means for avoiding various disadvantages such as foaming, solidification of polymer due to evaporation latent heat of water, etc. In addition, the removal of a large amount of water requires a high heat-energy consumption. Thus, the conventional continuous process using an aqueous solution of nylon salt involves various technical and economical problems.

Japanese Patent Publication No. 44-3838 proposes a continuous polymerization using a nylon salt as the starting material. However, the proposed process is not efficient because additional steps for isolation and purification of nylon salt are required.

U.S. Pat. No. 5,674,974 discloses a continuous polymerization using no nylon salt or no aqueous solution of nylon salt as the starting material. In the proposed process, a molten dicarboxylic acid component or a molten dicarboxylic acid-rich component is fed to a multistage reactor, and a vapor or liquid diamine component is fed at the second and subsequent stages while controlling the molar balance of the dicarboxylic acid component and the diamine component by a feedback control system utilizing near infrared spectroscopy. However, unlike the use of nylon salt or its aqueous solution, the process where the monomer components are separately and continuously fed into a continuous polymerization reactor is less accurate in the charge amounts, and it is difficult to achieve, by a flow controller, a molar balance sufficiently accurate for controlling the polymerization degree of polyamide. Therefore, the proposed process requires to detect and adjust the molar balance throughout the polymerization step.

In stead of using nylon salt or its aqueous solution, the best alternative for controlling the molar balance between charged polyamide-constituting components is a method where the amounts of the diamine component and the dicarboxylic acid component are separately measured in batch-wise manner by a mass measuring device such as a load cell, and then each component is fed into the reactior. For example, known is a method in which a molten dicarboxylic acid component is fed to a reactor after measuring its amount by a mass measuring device, and then a diamine component is fed to the reaction system while measuring its amount by a mass measuring device, thereby controlling the molar balance of the dicarboxylic acid component and the diamine component. As disclosed in Japanese Patent Application Laid-Open No. 58-111829, this method is suitably applicable to produce polyamide by a polymerization under ordinary pressure without using nylon salt as the starting material. However, since the mixing of the diamine component with the dicarboxylic acid component is carried out at a temperature higher than the melting point of the dicarboxylic acid component, the amidation proceeds remarkably. In addition, when the mixture is finally subjected to a continuous polymerization, the variation in polymerization degree detrimentally occurs due to the different residence times in transferring the mixture from a batch-wise regulation tank to a continuous polymerization reactor. Therefore, the mixture (reaction product) of the dicarboxylic acid component and the diamine component prepared by this method cannot be a stable starting material for the polymerization.

SUMMARY OF THE INVENTION

An object of the present invention is to provide a method for producing polyamide without using nylon salt or its aqueous solution as the starting material to be fed to a polymerization reactor, in which a molar-balanced mixture of a diamine component and a dicarboxylic acid component being substantially free from amidation reaction is prepared by using a batch-wise mass measuring method capable of accurately controlling the molar balance between the diamine component and the dicarboxylic acid component (hereinafter may be referred to as "molar balance"), and the resultant mixture is fed to a batch-wise or continuous polymerization reactor where polyamide is suitably produced.

As a result of extensive studies, the inventors have found that a mixture of a diamine component comprising 80 mol % or more of xylylenediamine and a dicarboxylic acid component provides an extremely stable, uniform slurry free from amidation when prepared in the absence of a solvent at a temperature within a specific range and at a specific water content.

Thus, in an aspect of the present invention, there is provided a process for producing polyamide by polymerization of a diamine component comprising 80 mol % or more of xylylenediamine and a dicarboxylic acid component, comprising the steps of (1) feeding the diamine component to a batch-wise regulation tank after accurately measuring the mass of the diamine component; (2) adding the dicarboxylic acid component to the liquid diamine component in the batch-wise regulation tank in an amount so as to attain a desired molar balance between the diamine component and the dicarboxylic acid component while stirring the liquid diamine component, thereby preparing a slurry liquid substantially free from amidation; and (3) feeding the slurry liquid to a polymerization reactor as a starting material for the polyamide.

In another aspect of the present invention, there is provided a process for producing polyamide by polymerization of a diamine component comprising 80 mol % or more of xylylenediamine and a dicarboxylic acid component, comprising a step (1) of preparing a substantially amidation-free slurry liquid comprising a diamine component and a dicarboxylic acid component, by feeding the diamine component to a batch-wise regulation tank after accurately measuring the mass of the diamine component, and adding the dicarboxylic acid component while stirring the liquid diamine component in the batch-wise regulation tank in an amount so as to attain a desired molar balance between the diamine component and the dicarboxylic acid component; a step (2) of continuously feeding the slurry liquid to a continuous polymerization reactor configured so as to minimize the escape of a vapor phase component from a reaction system and ensure complete vapor-liquid mixing, heating the slurry liquid to proceed amidation reaction, and heating the polyamide being produced to a temperature of a melting point thereof or higher; and a step (3) of increasing a polymerization degree by removing condensation water generated by the amidation reaction from the polyamide at a temperature of the melting point thereof or higher.

DETAILED DESCRIPTION OF THE INVENTION

In the present invention, a diamine component comprising 80 mol % of xylylenediamine and a dicarboxylic acid component are used as the polyamide-constituting components. Xylylenediamine may include m-, p- and o- xylylenediamine and may be a mixture thereof. The mixing ratio of the xylylenediamine isomers is not critical and may be arbitrarily selected as far as the melting point of the xylylenediamine mixture is 80° C. or lower. One of the reasons for using xylylenediamine suitably in the present invention is that the boiling point of xylylenediamine is higher than the melting point of polyamide. To obtain polyamide having a predetermined molar balance, it is important to increase the accuracy of the charge amounts of the starting diamine component and dicarboxylic acid component as well as to efficiently fix the diamine component during polymerization. In this point of view, the boiling point of xylylenediamine higher than the melting point of polyamide is greatly advantageous for efficient fixation of the diamine component and control of the molar balance. As the diamine component other than xylylenediamine, usable are tetramethylenediamine, hexamethylenediamine, 1,3-bisaminomethylcyclohexane, etc.

The dicarboxylic acid component may include adipic acid, succinic acid, sebacic acid, dodecanedioic acid, isophthalic acid, terephthalic acid, 2,6-naphthalene dicarboxylic acid, etc. These dicarboxylic acids may be used alone or in combination of two or more. In view of practical properties of polyamide to be produced, the dicarboxylic acid component preferably comprises 50 mol % or more of adipic acid. In addition to the diamine component and the dicarboxylic acid component, the polyamide-constituting component may include a lactam such as caprolactam, valerolactam, laurolactam, undecalactam, etc. or an aminocarboxylic acid such as 11-aminoundecanoic acid, 12-aminododecanoic acid, etc., in such an amount as not adversely affecting the most important feature of the present invention, i.e., the preparation of an amidation-free slurry liquid.

The molar balance of the monomers constituting polyamide after the polymerization (hereinafter referred to as "polyamide molar balance") may be diamine component-rich, dicarboxylic acid component-rich or equimolar with respect to the diamine component and the dicarboxylic acid component. To achieve an intended polyamide molar balance, generally, the molar balance of the charge amounts of the materials for polyamide is preferably set to diamine component-excess to make up for the loss of the diamine component by escaping from the reaction system together with condensation water resulted from the amidation reaction, and the charge ratio (diamine component/dicarboxylic acid component by mole) is generally selected so that the diamine component is excessive as compared to the intended polyamide molar ratio by 0.0005 to 0.005. In the present invention, a mass measuring device such as a load cell and a balance is suitably used for measuring the masses of the diamine component and the dicarboxylic acid component. For example, a predetermined amount of each of the diamine component and the dicarboxylic acid component is fed to a batch-wise regulation tank while measuring their masses by monitoring the change in the mass of measuring tanks respectively storing the diamine component and the dicarboxylic acid component.

During the addition of the dicarboxylic acid component to the liquid diamine component in a batch-wise regulation tank and after the addition until the slurry liquid is fed into a polymerization reactor, the temperature of the diamine component and the slurry liquid is preferably kept at a temperature from the solidification temperature of the diamine component to 80° C. When kept lower than the solidification temperature of the diamine component, the reaction system cannot be uniformly mixed by stirring and the feed of the slurry liquid to a polymerization reactor becomes difficult. When the temperature of the diamine component or the slurry liquid exceeds 80° C., the formation of nylon salt becomes remarkable to cause a thermal accumulation of neutralization heat, thereby steeply raising the temperature of the reaction system. The temperature rise further accelerates the formation of nylon salt. Since the formed nylon salt gives a granular mixture in stead of slurry liquid, the uniform mixing by stirring is prevented. Such a steep rise of the temperature and the local overheat initiate the amidation reaction, and as a result thereof, condensation water is evolved into the reaction system. Since water catalyzes the formation of nylon salt, the formation of nylon salt and the amidation reaction continue in succession. The formation of nylon salt and the amidation reaction do not generate sufficient heat for making polyamide uniform liquid state, and therefore, the reaction system becomes bulky to make uniform mixing by stirring completely impossible.

In the present invention, a uniform and stable slurry liquid comprising the diamine component and the dicarboxylic acid component which are substantially free from amidation can be prepared without needing a solvent during and after the addition of the dicarboxylic acid component to the liquid diamine component in a batch-wise regulation tank. Therefore, the method of the present invention can be carried out in the absence of the solvent. In the present invention, "substantially amidation-free" or "substantially free from amidation" can be confirmed by no detectable condensation water formed by amidation.

The water content in the slurry liquid prepared in the batch-wise regulation tank is preferably 0.7 mass % or less, more preferably 0.5 mass % or less based on the amount of the slurry liquid. When higher than 0.7 mass %, the formation of nylon salt becomes remarkable even when the diamine component or the slurry liquid is maintained at 80° C. or lower because water catalyzes the formation of nylon salt, and as a result thereof, the temperature of the reaction system is rapidly raised due to the accumulation of neutralization heat, this further accelerating the formation of nylon salt. Therefore, as described above, the amidation reaction begins and the formation of nylon salt and the amidation reaction continue in succession by the action of condensation water being evolved. Since the formation of nylon salt and the amidation do not generate sufficient heat for making polyamide uniform liquid state, the reaction system becomes bulky to make uniform mixing by stirring completely impossible.

The diamine component to be fed into the batch-wise regulation tank may be liquid or solid, and preferably liquid having a temperature from its solidification point to 80° C. for easiness of handling and for the same reasons mentioned above. Also, for the same reasons mentioned above, the water content of the diamine component is preferred to be low. Commercially available diamines are generally purified by distillation, general products industrially produced have a water content (usually, 0.1 mass % or less) suitable for use in the present invention. Therefore, commercially available diamines can be used as such without needing any additional drying operation. After measuring the mass by a mass measuring device, the diamine component meeting the above requirements is fed into the batch-wise regulation tank. The measurement of the mass is preferably carried out in an inert gas such as nitrogen.

The dicarboxylic acid component to be added to the diamine component in the batch-wise regulation tank may be liquid or solid. The temperature of the dicarboxylic acid component is preferably 80° C. or lower for the same reasons mentioned above. Also, for the same reasons mentioned above, the water content of the dicarboxylic acid component is preferred to be low. Dicarboxylic acids industrially produced usually have a water content of 0.1 to 0.2 mass %, and suitable for use in the present invention. After measuring the mass by a mass measuring device, the dicarboxylic acid component meeting the above requirements is fed into the batch-wise regulation tank. The measurement of the mass is preferably carried out in an inert gas such as nitrogen.

The batch-wise regulation tank used in the present invention is not strictly limited as far as it has an agitation capacity and an agitation power sufficient for preparing a uniform slurry liquid. After the slurry liquid is prepared and until the resultant slurry liquid is fed into the polymerization reactor, the agitation in the batch-wise regulation tank may be continued or discontinued. To avoid the oxidation of polyamide, the oxygen content of the slurry liquid is reduced to as low a level as possible. For this purpose, the batch-wise regulation tank preferably has a construction capable of replacing its inner atmosphere with an inert gas such as nitrogen.

By the sequential use of two or more batch-wise regulation tanks, the slurry liquid prepared in the batch-wise regulation tanks can be continuously fed into the polymerization reactor as the material for polyamide production. Since the slurry liquid in the batch-wise regulation tank is substantially free from amidation, is homogeneous and is stable, the properties of the slurry liquid are independent of the difference in residence time even in the continuous production of polyamide by feeding the slurry liquid into a continuous polymerization reactor. Therefore, the transfer from the batch-wise step for preparing the slurry liquid, i.e., the step for adjusting the molar balance of the material to the continuous step for polymerization is easy.

When the slurry liquid prepared by the method of the present invention is fed into a batch-wise polymerization reactor, a reactor equipped with a partial condenser operated at ordinary pressure or under pressure is preferably used to maintain the molar balance achieved in the preparation step of the slurry liquid. However, since the boiling point of xylylenediamine is higher than the melting point of polyamide, the pressure can be set to fairly low pressure, for example, about 0.5 MPa or lower, as compared with the process using an aqueous solution of nylon salt as the starting material. In the batch-wise production, it is advantageous to rapidly raise the temperature of the slurry liquid to the melting point of polyamide, and therefore, the use of a large L/D horizontal reactor having a large heat transfer surface and a multi-stage stirring paddle is preferable. When a reactor of tank type is used, the amidation reaction is carried out by feeding the slurry liquid into the reaction system little by little while maintaining the reaction system at a temperature higher than the melting point of polyamide. Thus, the batch-wise amidation reaction is preferably carried out at a temperature from the melting point of polyamide being produced to a temperature of the melting point of polyamide+30° C. not exceeding 300° C. usually for 0.5 to 6 hours.

As described above, water catalyzes the formation of nylon salt in the slurry liquid to generate a large quantity of neutralization heat, this further promoting the amidation reaction. Therefore, it is highly advantageous for promoting the production of polyamide to add a small amount of water as the catalyst to a batch-wise polymerization reactor together with the slurry liquid. The addition amount of water is not strictly limited, and preferably 0.3 to 10 mass % based on the amount of slurry liquid. When less than 0.3 mass %, no appreciable effect is obtained. When exceeding 10 mass %, the increased amount of vapor phase in the batch-wise polymerization reactor detrimentally affects the fixation of the diamine component. In addition, the foaming and solidification of polyamide are caused during the separation of polyamide and condensation water.

The continuous method for producing polyamide of the present invention comprises a step (1) for preparation of the slurry liquid, a step (2) for amidation and a step (3) for removal of condensation water from polyamide. In the step (2), the diamine component is fixed into polyamide. To maintain the molar balance achieved in the step (1) during the fixation of the diamine component, it is important for the continuous polymerization reactor, into which the slurry liquid is fed, to have a construction capable of minimizing the escape of vapor phase component therefrom and achieving complete vapor-liquid mixing. Therefore, the reaction system is kept at ordinary pressure to about 3 MPa, and the continuous polymerization reactor is preferably made into sealed structure equipped with a gear pump, etc. disposed at a feed opening and/or an outlet. Further, it is important for the continuous polymerization reactor to be capable of gradually raising the temperature of the slurry liquid in the flowing direction within a temperature range from the melting point of polyamide to a temperature of the melting point +10° C. For this purpose, a horizontal twin-agitator mixer, etc. is preferably used.

In the step (3), the polymerization degree of polyamide is increased to an intended level. To facilitate the removal of condensation water as vapor from polyamide, the reaction system is kept within a temperature range from the melting point of polyamide to a temperature of the melting point +30° C. and kept under a pressure lower than that of the step (2), preferably 0.006 to 0.5 MPa. The step (3) may be carried out using two or more continuous polymerization reactors, and the operating manner and the number of the reactors can be determined according to the desired polymerization degree of polyamide. Alternatively, the polymerization degree of polyamide can be preferably increased by using at least one polymerization reactor maintained at ordinary pressure to a reduced pressure of about 1 kPa after removing a major portion of condensation water generated in the step (2) by a vapor-liquid separation tank disposed downstream the step (2). It is industrially advantageous to recover the diamine component by a partial condenser from the water vapor removed from polyamide, and to recycle the recovered diamine component to the continuous polymerization reactor together with the slurry liquid of the diamine component and the dicarboxylic acid component.

As mentioned above, water catalyzes the formation of nylon salt to induce the evolution of a large quantity of neutralization heat. As a result thereof, water also promotes the amidation reaction. Therefore, it is extremely advantageous for promoting the polymerization to add a small amount of water as the catalyst when the slurry liquid is fed to the continuous polymerization reactor in the step (2). The addition amount of water is not strictly limited, and the slurry liquid is added with water preferably so as to have a water content of 0.3 to 10 mass %. A water content less than 0.3 mass % shows no appreciable effect. A water content exceeding 10 mass % increases the vapor phase in the continuous polymerization reactor to detrimentally affect the fixation of the diamine component, and also causes foaming and solidification of polyamide during the separating operation of polyamide and condensation water.

The removal of the condensation water generated by the amidation reaction from polyamide in the step (3) is preferably carried out after the number average molecular weight of polyamide reaches 1000 or higher, more preferably 2000 or higher. The removal after reaching a molecular weight of 1000 or higher is extremely advantages in controlling the molar balance of polyamide, because the fixation of the polyamide constituting components, particularly the diamine component into polyamide sufficiently proceeds, thereby preventing the escape of the diamine component from the reaction system. The upper limit of the number average molecular weight is not particularly limited.

The process for producing polyamide of the present invention has the following advantages:
(i) The foaming and solidification of polyamide during the removal of a large amount of water is avoided because an aqueous solution of nylon salt is not used as the starting material.
(ii) Since the charged amount of the starting diamine component and dicarboxylic acid component is accurately controlled by the batch-wise mass measuring device, the accuracy of the charged molar balance is improved.

The present invention will be explained in more detail by reference to the following examples which should not be construed to limit the scope of the present invention.

The measurements for evaluations were made by the following methods.

(A) Amount of amino end groups ($\mu$eq/g)

An accurate amount of polyamide was dissolved in a mixed solvent of phenol/ethanol=4/1 (volume ratio) at 20 to 30° C. by stirring. After completely dissolved, the resultant solution was subjected to neutralization titration by 0.1 mol/liter ("liter" is hereinafter symbolized as "L") hydrochloric acid, and the amount of amino end groups was calculated from the result.

(B) Amount of carboxyl end groups ($\mu$eq/g)

An accurate amount of polyamide was dissolved in benzyl alcohol at 160 to 180° C. in nitrogen stream by stirring. After completely dissolved, the resultant solution was cooled to 80° C. in nitrogen stream and then added with 10 cc of methanol. Then, the solution was subjected to neutralization titration by 0.1 mol/L aqueous solution of sodium hydroxide, and the amount of carboxyl end groups was calculated from the result.

(C) Number average molecular weight

The number average molecular weight was calculated from the following equation using the obtained amount of carboxyl end groups and amount of amino end groups.

Number average molecular weight=$2\times10^6$/([NH$_2$]+[COOH]) wherein [NH$_2$] is the amount of amino end groups and [COOH] is the amount of carboxyl end groups.

(D) Water content (mass %)

The water content was determined using a Karl Fischer's micro-moisture meter (CA-05 Model manufactured by Mitsubishi Chemical Corporation).

EXAMPLES 1–2 and COMPARATIVE EXAMPLE 1

Into a 2-L stainless vessel, 546.44 g (4 mol) of m-xylylenediamine (purity: 99.70 mass %) were charged and stirred in nitrogen stream in an oil bath to raise the temperature of the diamine component to the predetermined level. Then, 585.44 g (4 mol) of adipic acid (purity: 99.85 mass %) were added to the stainless vessel over three minutes. Stirring was continued while keeping the stainless vessel immersed in the oil bath which was maintained at the preset temperature. During the stirring, the state of the system was observed at two minutes, 10 minutes, 30 minutes and 120 minutes after the addition of the adipic acid was completed. Separately, the water content of the system was measured on a small amount of the sampled slurry liquid at two minutes after the addition of the adipic acid was completed. The results are shown in Table 1.

TABLE 1

|  | Example 1 | Example 2 | Comparative Example 1 |
|---|---|---|---|
| Temperature (° C.) | 22 | 80 | 90 |
| Water content (mass %) | 0.35 | 0.34 | 0.34 |
| State of System After Completion of Adipic Acid Addition | | | |
| After 2 minutes | | | |
| temperature (° C.) | 34 | 75 | 170 |
| stirring condition | good | good | impossible |
| mixture condition | slurry liquid | slurry liquid | mass |
| condensation water | no generation | no generation | generated |
| After 10 minutes | | | |
| temperature (° C.) | 35 | 80 | — |
| stirring condition | good | good | — |
| mixture condition | slurry liquid | slurry liquid | — |
| condensation water | no generation | no generation | — |
| After 30 minutes | | | |
| temperature (° C.) | 57 | 80 | — |
| stirring condition | good | good | — |
| mixture condition | slurry liquid | slurry liquid | — |
| condensation water | no generation | no generation | — |
| After 120 minutes | | | |
| temperature (° C.) | 42 | 80 | — |
| stirring condition | good | good | — |
| mixture condition | slurry liquid | slurry liquid | — |
| condensation water | no generation | no generation | — |

As seen from Table 1, when m-xylylenediamine and adipic acid were mixed at a temperature higher than 80° C. (Comparative Example 1), the temperature of the system rose steeply due to neutralization heat accompanied by the formation of nylon salt. The steep temperature rise then promoted the amidation reaction to cause generation of condensation water. As the amidation reaction proceeded, the stirring of the system became extremely difficult, and the system finally changed to bulky state, thereby failing to maintain the system homogeneous. On the other hand, when m-xylylenediamine and adipic acid were mixed at 80° C. or lower (Examples 1–2), the system was kept at 80° C. or lower after the addition of adipic acid was completed and caused no generation of condensation water. In addition, the stirring was continued effectively to produce a homogeneous slurry liquid.

EXAMPLES 3–4 and COMPARATIVE EXAMPLES 2–3

Into a 2-L stainless vessel, 546.44 g (4 mol) of m-xylylenediamine (purity: 99.70 mass %) was charged with a predetermined amount of water and stirred in nitrogen stream in an oil bath to raise the temperature of the diamine component to the predetermined level. Then, 585.44 g (4 mol) of adipic acid (purity: 99.85 mass %) were added to the stainless vessel over three minutes. Stirring was continued while keeping the stainless vessel immersed in the oil bath which was maintained at the preset temperature. During the stirring, the state of the system was observed at two minutes, 10 minutes and 30 minutes after the addition of the adipic acid was completed. Separately, the water content of the slurry liquid was measured on a small amount thereof sampled at 2 minutes after the addition of the adipic acid was completed. The results are shown in Table 2.

TABLE 2

|  | Example 3 | Comparative Example 2 | Example 4 | Comparative Example 3 |
|---|---|---|---|---|
| Temperature (° C.) | 40 | 40 | 80 | 80 |
| Water content (mass %) | 0.63 | 0.74 | 0.51 | 0.72 |
| State of System After Completion of Adipic Acid Addition | | | | |
| After 2 minutes | | | | |
| temperature (° C.) | 66 | 68 | 75 | 179 |
| stirring condition | good | good | good | impossible |
| mixture condition | slurry liquid | slurry liquid | slurry liquid | mass |
| condensation water | no generation | no generation | no generation | generated |
| After 10 minutes | | | | |
| temperature (° C.) | 66 | 168 | 80 | — |
| stirring condition | good | impossible | good | — |
| mixture condition | slurry liquid | mass | slurry liquid | — |

TABLE 2-continued

|  | Example 3 | Comparative Example 2 | Example 4 | Comparative Example 3 |
|---|---|---|---|---|
| condensation water | no generation | generated | no generation | — |
| After 30 minutes |  |  |  |  |
| temperature (° C.) | 64 | — | 80 | — |
| stirring condition | good | — | good | — |
| mixture condition | slurry liquid | — | slurry liquid | — |
| condensation water | no generation | — | no generation | — |

As seen from Table 2, when the water content exceeded 0.7 mass %, the steep temperature rise and the generation of condensation water occurred even if m-xylylenediamine and adipic acid were mixed at 80° C. or lower. In addition, the stirring of the system became difficult to make the system bulky, thereby failing to maintain the system homogeneous.

EXAMPLES 5–6

Each of the m-xylylenediamine/adipic acid slurry liquids obtained in Examples 1 and 2 were continuously fed to a 20 mm φ twin-screw extruder of no vent type under nitrogen stream, and then, fed to a 20 mm φ single-screw extruder having a vent opening kept at ordinary pressure. Both the twin screws rotated in the same direction, and the L/D ratio of the screw was 25 for each of the twin-screw extruder and the single-screw extruder. The extruding conditions, the molar balance obtained from the amount of amino end groups and the amount of carboxyl end groups, and the number average molecular weight are shown in Table 3.

TABLE 3

|  | Example 5 | Example 6 |
|---|---|---|
| Extruding Conditions |  |  |
| temperature of polyamide (° C.) | 250 | 250 |
| overall residence time (min.) | 6 | 12 |
| Properties of Polyamide |  |  |
| MXDA/AA (molar ratio) | 0.990 | 0.992 |
| Number average molecular weight | 2890 | 4210 |

MXDA:m-xylylenediamine
AA:adipic acid

The extrudate of the m-xylylenediamine/adipic acid slurry liquid was confirmed to be polyamide with a sufficient polymerization degree, and the molar balance of the slurry liquid (diamine component/dicarboxylic acid component: 1.000) was substantially retained in the resultant polyamide.

EXAMPLE 7 and COMPARATIVE EXAMPLE 4

A slurry liquid of m-xylylenediamine/p-xylylenediamine/adipic acid (70/30/100 by mole) obtained in the same manner as in Example 1 was continuously fed into the twin-screw extruder mentioned above, and then, fed to a vapor-liquid separating tank. The molar balance obtained from the amount of amino end groups and the amount of carboxyl end groups, and the number average molecular weight are shown in Table 4. The extrudate of the slurry liquid was confirmed to be polyamide with a sufficient polymerization degree, and the molar balance of the slurry liquid (diamine component/dicarboxylic acid component: 1.000) was substantially retained in the resultant polyamide when the number average molecular weight reached 1000 or more.

TABLE 4

|  | Example 7 | Comparative Example 4 |
|---|---|---|
| Extruding Conditions |  |  |
| temperature of polyamide (° C.) | 260 | 240 |
| residence time (min.) | 12 | 3 |
| Properties of Polyamide |  |  |
| XDA/AA (molar ratio) | 0.993 | 0.978 |
| Number average molecular weight | 4550 | 810 |

XDA:xylylenediamines
AA:adipic acid

EXAMPLE 8

A 2-L stainless polymerization reactor equipped with a stirring paddle and a partial condenser was heated to 250° C. and 200 g of a m-xylylenediamine/adipic acid slurry liquid prepared according to the method of the present invention were fed to the reactor at a feeding rate of 5 g/min under ordinary pressure while maintaining the reactor at 250° C. After feeding, the slurry liquid was heated to 260° C. over 30 minutes, and then kept at 260° C. under a reduced pressure of 80 kPa for 20 minutes. The molar balance obtained from the amount of amino end groups and the amount of carboxyl end groups of the resultant polyamide, and the number average molecular weight are shown in Table 5.

EXAMPLE 9

The same polymerization reactor as used in Example 8 was heated to 270° C. and 200 g of a m-xylylenediamine/p-xylylenediamine/adipic acid/terephthalic acid (55/45/85/15 by mole) slurry liquid prepared according to the method of the present invention were fed to the reactor at a feeding rate of 5 g/min under ordinary pressure while maintaining the reactor at 270° C. After feeding, the slurry liquid was kept at 270° C. for 30 minutes, and further kept at 270° C. under a reduced pressure of 80 kPa for 20 minutes. The molar balance obtained from the amount of amino end groups and the amount of carboxyl end groups of the resultant polyamide, and the number average molecular weight are shown in Table 5.

The extrudate of the slurry liquid was confirmed to be polyamide with a sufficient polymerization degree, and the molar balance of the slurry liquid (diamine component/ dicarboxylic acid component: 1.000) was substantially retained in the resultant polyamide

TABLE 5

|  | Example 8 | Example 9 |
|---|---|---|
| Molar balance (diamine component/dicarboxylic acid component) | 0.992 | 0.990 |
| Number average molecular weight | 14210 | 13550 |

What is claimed is:

1. A process for producing polyamide by polymerization of a diamine component comprising 80 mol% or more of xylylenediamine and a dicarboxylic acid component, comprising the steps of:

feeding the diamine component to a batch-wise regulation tank after accurately measuring the mass of the diamine component;

adding the dicarboxylic acid component to the liquid diamine component in the batch-wise regulation tank in an amount so as to attain a desired molar balance between the diamine component and the dicarboxylic acid component while stirring the liquid diamine component, thereby preparing a slurry liquid substantially free from amidation; and feeding the slurry liquid to a polymerization reactor as a starting material for the polyaminde, wherein the diamine component and the slurry liquid are maintained at a temperature from a solidification temperature of the diamine component to 80° C. during the addition of the dicarboxylic acid component to the diamine component in the batch-wise regulation tank and after the addition, and a water content in the slurry liquid is regulated to 0.7 mass % or less.

2. The process according to claim 1, wherein the mass of each of the diamine component and the dicarboxylic acid component is measured by using a measuring tank equipped with a mass measuring device.

3. The process according to claim 1, wherein the molar balance between the diamine component and the dicarboxylic acid component is set in excess of the diamine component so as to make up for a loss of the diamine component by escaping from a reaction system together with condensation water generated by amidation reaction.

4. The process according to claim 1, wherein xylylenediamine comprises 50 mol% or more of adipic acid.

5. The process according to claim 1, wherein the slurry liquid is continuously fed into a polymerization reactor as a starting material for the polyamide by sequentially using two or more of batch-wise regulation tanks.

6. The process according to claim 1, wherein the slurry liquid is fed into a batch-wise polymerization reactor as a starting material for the polyamide.

7. The process according to claim 6, wherein water is added to the batch-wise polymerization reactor together with the slurry liquid in an amount of 0.3 to 10 mass % based on the slurry liquid.

8. The process according to claim 1, wherein the slurry liquid is fed to a continuous polymerization reactor as a starting material for the polyamide.

9. The process according to claim 8, comprising: a step (1) of preparing a substantially amidation-free slurry liquid comprising a diamine component and a dicarboxylic acid component, by feeding the diamine component to a batch-wise regulation tank after accurately measuring the mass of the diamine component, and adding the dicarboxylic acid component while stirring the liquid diamine component in the batch-wise regulation tank in an amount so as to attain a desired molar balance between the diamine component and the dicarboxylic acid component;

a step (2) of continuously feeding the slurry liquid to a continuous polymerization reactor configured so as to minimize the escape of a vapor phase component from a reaction system and ensure complete vapor-liquid mixing, heating the slurry liquid to proceed amidation reaction, and heating the polyamide being produced to a temperature of a melting point thereof a higher; and a step (3) of increasing a polymerization degree by removing condensation water generated by the amidation reaction from the polyamide at a temperature of the melting point thereof or higher.

10. The process according to claim 9, wherein water is fed to the continuous polymerization reactor together with the slurry liquid in the step (2) so as to regulate a water content of the slurry within 0.3 to 10 mass %.

11. The process according to claim 9, wherein the diamine component recovered by fractional condensation from the condensation water removed in the step (3) is recycled to the continuous polymerization reactor together with the feeding of the slurry liquid in the step (2).

12. The process according to claim 9, wherein the continuous polymerization reactor is a horizontal twin-screw agitation mixer of enclosed structure.

13. The process according to claim 9, wherein the removal of the condensation water generated by the amidation reaction in the step (3) is carried out after a number average molecular weight of the polyamide reaches 1000 or more.

14. The process according to claim 1, wherein the water content in the slurry liquid is regulated to 0.5 mass% or less.

15. The process according to claim 1, wherein the dicarboxylic acid component has a temperature from a solidification point of the dicarboxylic acid component to 80° C., when added to the liquid diamine component.

16. A process for producing polyamide by polymerization of a diamine component comprising 80 mol% or more of xylylenediamine and a dicarboxylic acid component, comprising the steps of:

feeding the diamine component to a batch-wise regulation tank after accurately measuring the mass of the diamine component;

adding the dicarboxylic acid component to the liquid diamine component in the batch-wise regulation tank in an amount so as to attain a desired molar balance between the diamine component and the dicarboxylic acid component while stirring the liquid diamine component, thereby preparing a slurry liquid substantially free from amidation; and feeding the slurry liquid to a polymerization reactor as a starting material for the polyamide, wherein the diamine component and the slurry liquid are maintained at a temperature from a solidification temperature of the diamine component to 80° C. during the addition of the dicarboxylic acid component to the diamine component in the batch-wise regulation tank and after the addition.

17. The process according to claim 16, wherein the dicarboxylic acid conponent has a temperature from a solidigication point of the dicarboxylic acid component to 80° C., when added to the liquid diamine component.

18. A process for producing polyamide by polymerization of a diamine component comprising 80 mol% or more of xylylenediamine and a dicarboxylic acid component, comprising the steps of:

feeding the diamine component to a batch-wise regulation tank after accurately measuring the mass of the diamine component;

adding the dicarboxylic acid component to the liquid diamine component in the batch-wise regulation tank in an amount so as to attain a desired molar balance between the diamine component and the dicarboxylic acid component while stirring the liquid diamine component, thereby preparing a slurry liquid substantially free from amidation; and feeding the slurry liquid to a polymerization reactor as a starting material for the polyamide, wherein a water content in the slurry liquid prepared in the batch-wise regulating tank is 0.7 mass % or less.

19. The process according to claim 1, wherein the water content in the slurry liquid is regulated to 0.5 mass% or less.

* * * * *